United States Patent
Hügel

(10) Patent No.: US 9,982,634 B2
(45) Date of Patent: May 29, 2018

(54) CRANKCASE VENTILATION SYSTEM FOR ENGINES CAPABLE OF OPERATING IN ROLL-OVER SITUATIONS AND/OR IN STEEPLY OBLIQUE POSITIONS

(71) Applicant: MAN TRUCK & BUS AG, München (DE)

(72) Inventor: Dietmar Hügel, Nürnberg (DE)

(73) Assignee: MAN Truck & Bus AG, Munich (DE)

( * ) Notice: Subject to any disclaimer, the term of this patent is extended or adjusted under 35 U.S.C. 154(b) by 70 days.

(21) Appl. No.: 15/159,386

(22) Filed: May 19, 2016

(65) Prior Publication Data
US 2016/0341153 A1 Nov. 24, 2016

(30) Foreign Application Priority Data
May 19, 2015 (DE) .................. 10 2015 006 446

(51) Int. Cl.
| | | |
|---|---|---|
| F02M 25/06 | (2016.01) | |
| F01M 11/06 | (2006.01) | |
| F01M 13/04 | (2006.01) | |
| F01M 13/02 | (2006.01) | |

(52) U.S. Cl.
CPC .......... *F02M 25/06* (2013.01); *F01M 11/065* (2013.01); *F01M 11/067* (2013.01); *F01M 13/04* (2013.01); *F01M 2011/068* (2013.01); *F01M 2013/027* (2013.01); *F01M 2013/0494* (2013.01)

(58) Field of Classification Search
CPC .. F01M 13/04; F01M 13/028; F01M 13/0011; F01M 13/023; F01M 13/00; F01M 2013/0461; F01M 2013/0488
See application file for complete search history.

(56) References Cited

U.S. PATENT DOCUMENTS

| | | | |
|---|---|---|---|
| 4,549,520 A | 10/1985 | Tamba et al. | |
| 4,721,090 A * | 1/1988 | Kato | F01L 1/0532 123/41.86 |
| 6,029,638 A | 2/2000 | Funai et al. | |
| 6,092,492 A | 7/2000 | Kampichler et al. | |
| 6,408,835 B1 * | 6/2002 | Katayama | F02B 61/045 123/514 |
| 6,491,556 B2 * | 12/2002 | Muramatsu | B63B 35/731 123/196 R |
| 8,408,190 B2 * | 4/2013 | Spix | F01M 13/022 123/572 |

(Continued)

FOREIGN PATENT DOCUMENTS

| | | |
|---|---|---|
| JP | 58-156111 | 10/1983 |
| JP | 61-182410 | 8/1986 |

OTHER PUBLICATIONS

Search Report dated Sep. 15, 2016 which issued in the corresponding European Patent Application No. 16000859.

*Primary Examiner* — Long T Tran
(74) *Attorney, Agent, or Firm* — Cozen O'Connor

(57) ABSTRACT

A crankcase ventilation system, preferably for an engine capable of operation in roll-over situations and/or in steeply oblique positions, and/or for permitting such operation. The crankcase ventilation system includes a crankcase, preferably at least one extraction point for blow-by, and at least one blow-by separator a blow-by separation container. The at least one blow-by separator and the blow-by separation container are connected to one another.

18 Claims, 1 Drawing Sheet

(56) References Cited

U.S. PATENT DOCUMENTS

| | | | | |
|---|---|---|---|---|
| 2002/0081919 | A1* | 6/2002 | Muramatsu | B63B 35/731 |
| | | | | 440/89 J |
| 2002/0164906 | A1* | 11/2002 | Nanami | B63B 35/731 |
| | | | | 440/1 |
| 2005/0092309 | A1* | 5/2005 | Bedkowski | F01M 13/04 |
| | | | | 123/572 |
| 2013/0008420 | A1* | 1/2013 | Spix | F01M 13/022 |
| | | | | 123/573 |
| 2014/0149015 | A1* | 5/2014 | Pursifull | F02M 25/06 |
| | | | | 701/101 |
| 2016/0146076 | A1* | 5/2016 | Newman | F02B 37/00 |
| | | | | 123/559.1 |

* cited by examiner

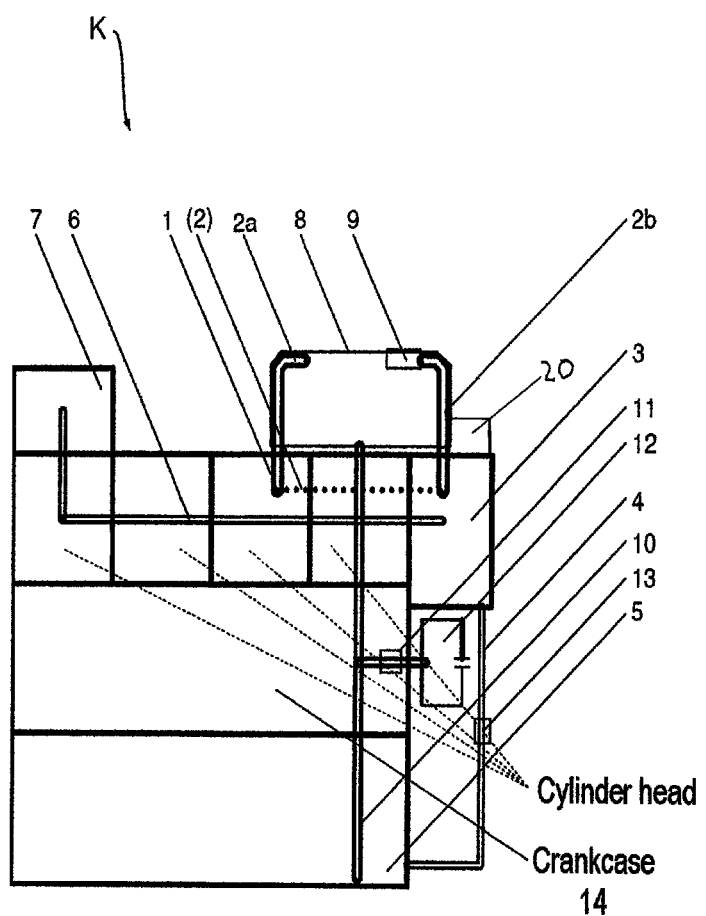

CRANKCASE VENTILATION SYSTEM FOR ENGINES CAPABLE OF OPERATING IN ROLL-OVER SITUATIONS AND/OR IN STEEPLY OBLIQUE POSITIONS

BACKGROUND OF THE INVENTION

1. Field of the Invention

The invention relates to a crankcase ventilation system, preferably for an engine capable of operation in roll-over situations and/or in steeply oblique positions, for example a marine engine, in particular for a ship or boat.

2. Description of the Related Art

Crankcase ventilation systems for ships/boat engines are known and have an extraction point for blow-by, a blow-by line from the extraction point to a blow-by separator with pressure diaphragm, an oil return line from the oil separator into an oil pan, and a line for purified blow-by from the blow-by separator to an intake connector on a compressor.

A disadvantage of the known crankcase ventilation systems is that, in steeply oblique positions and/or in roll-over situations of the engine, oil is drawn in by the crankcase ventilation system and thus passes into a combustion chamber, which consequently leads to engine damage.

SUMMARY OF THE INVENTION

It is an object of one aspect of the invention to provide an improved crankcase ventilation system, preferably a crankcase ventilation system for enabling an engine to be capable of operating in roll-over situations and/or in steeply oblique positions, without oil being able to pass into the combustion chamber of an engine, which can consequently lead to engine damage.

One aspect of the invention provides a crankcase ventilation system, expediently for an engine, having a crankcase, preferably having at least one extraction point for blow-by, and having at least one blow-by separator.

The engine is preferably a ship engine or boat engine, in particular for use in a highly dynamic ship or boat, such as for example a rescue boat and/or coastal boat.

The crankcase ventilation system is characterized in particular by the fact that it is designed for an engine capable of operating in roll-over situations (which can be turned upside down, for example) and/or in steeply oblique positions, and/or for enabling an engine to operate in roll-over situations and/or enabling an engine to operate in steeply oblique positions, preferably without oil being able to pass into the combustion chamber of an engine, which can consequently lead to engine damage.

For this purpose, the crankcase ventilation system may in particular have at least one blow-by separation container in addition to the at least one blow-by separator, wherein the at least one blow-by separator and the at least one blow-by separation container are connected to one another.

In the context of the invention, the feature "operation in steeply oblique positions" and/or "capability of operating in steeply oblique positions" encompasses in particular inclinations of the engine and/or of the crankcase ventilation system of over 45°, over 60°, over 75° or over 80° relative to the horizontal. It is expediently possible, but not imperative, that this consequently likewise leads to a roll-over of the engine and/or of the crankcase ventilation system.

It is possible for the blow-by separation container to be arranged above the level, in particular above the at least one blow-by separator, expediently directly adjacent thereto.

The blow-by separation container may furthermore be arranged, for example mounted, on the side of an engine.

The blow-by separation container may furthermore be arranged separately from the engine. The blow-by separation container may be fastened to a vehicle frame, to a foundation frame, to a ship wall etc. The blow-by separation container may expediently be connected to the engine by way of at least one, preferably flexible, line.

The blow-by separator may be connected to the blow-by separation container via at least one blow-by connector for example a connecting line. The blow-by connector preferably terminates in an upper section of the blow-by separation container, preferably directly below a roof and/or ceiling section, or at least adjacent thereto.

The blow-by separation container may preferably be connected to the at least one extraction point via at least one blow-by connecting device, for example a connecting line. The blow-by connecting device preferably terminates in an upper section of the blow-by separation container, preferably directly below a roof and/or ceiling section, or at least adjacent thereto.

The blow-by connector may be connected to a shut-off part. The shut-off part preferably serves for preventing a blow-by flow from the blow-by separation container in the direction of the at least one blow-by separator, or even into the blow-by separator. It is possible for the shut-off part to be integrated into the blow-by separation container and/or designed to be electrically, mechanically or magnetically actuable. The shut-off part may be designed as a solenoid valve or flap.

It may be provided that the crankcase ventilation system is functional even without the shut-off part. In this case, the blow-by separation container functions as a collecting volume, coarse separator and/or pre-separator.

It is possible for the at least one blow-by connecting device and/or the at least one blow-by connector to comprise, preferably in the blow-by separation container, an expediently upper, substantially horizontal section and a section that expediently extends downwards from said upper section. The downwardly extending section may preferably be oriented substantially vertically. The profiles (horizontal/vertical) may also be merely tendential; what is functionally relevant is the rising or falling profile in the case of an arrangement of the separation container in the upper engine section.

The at least one blow-by connecting device and/or the at least one blow-by connector may for example be of substantially L-shaped form. The downwardly extending section of the at least one blow-by connecting device may preferably be connected to the at least one extraction point.

The downwardly extending section of the at least one blow-by connector may preferably be connected to the blow-by separator.

The blow-by separation container may be connected via at least one oil return element (for example return line) to an oil pan. Via the oil return element, it is preferably possible for oil to be returned from the blow-by separation container into the oil pan.

It is possible for the at least one blow-by separator to be connected via at least one oil return, means for example return line, to an oil pan. Via the oil return, oil can be returned from the blow-by separator into the oil pan.

The oil return and/or the oil return element are designed in particular to terminate into an oil sump situated in the oil pan.

The oil return may have a safety means. The safety may be designed to prevent a back flow of oil from the oil pan into the blow-by separator. The safety may be in the form of a check valve, a solenoid valve flap, or some other shut-off element.

It is possible for the crankcase ventilation system to have a collecting container for any oil that escapes during operation in roll-over situations and/or in steeply oblique positions. The collecting container may for example be connected to the oil return element. It is possible for a safety element to be designed to open during operation in roll-over situations and/or in steeply oblique positions, such that any oil that escapes can pass via the safety element into the collecting container. In particular, if the pressure in the crankcase ventilation system rises above an admissible level, for example during operation in roll-over situations and/or in steeply oblique positions, it is preferably the case that the shut-off part is closed and the safety element is opened.

The safety element may be integrated in the oil return element, on or in the collecting container, or in a line between the oil return element and the collecting container.

The safety element may be in the form of a flap or a valve, preferably an overpressure and/or solenoid valve.

The crankcase ventilation system may comprise at least one detection device for the indirect or direct detection of oblique positions of the engine. The engine oblique positions may expediently be detected during engine operation, for example with the aid of at least one inclination sensor, seismic sensor, pendulum, etc.

It is possible for the shut-off part to be closed for a predefined time, and/or for the engine to be operated in reduced fashion or to be shut off, if a predetermined and/or inadmissible engine oblique position is detected by the detection device. Here, inadmissibly steeply oblique positions may be steep engine inclinations without roll-over occurring (for example of over 45°, 60°, 75° or over 80° relative to the horizontal) and/or steep engine inclinations followed by a roll-over of the engine (in particular oblique positions greater than 180°).

The crankcase ventilation system, in particular the blow-by separation container, is expediently designed to prevent oil, for example from an oil pan, from being able to enter a combustion chamber of the engine during engine operation in steeply oblique positions or in roll-over situations of the engine and/or of the crankcase ventilation system.

It should be noted that, in the context of the invention, the crankcase ventilation system may for example comprise one or more extraction points, one or more blow-by separators, one or more blow-by connecting devices, one or more blow-by connectors, one or more shut-off elements, one or more oil return elements, one or more oil returns, and/or one or more blow-by separation containers.

The embodiments, aspects, and features of the invention described above may be combined with one another and the FIGURE that shows a crankcase ventilation system according to an embodiment of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The FIGURE shows a schematic view of a crankcase ventilation system K according to an aspect of the invention, expediently for an engine capable of operation in roll-over situations and/or in steeply oblique positions, and/or for permitting such operation.

DETAILED DESCRIPTION OF THE PRESENTLY PREFERRED EMBODIMENTS

The capability of an engine to operate in roll-over situations, or the capability of an engine to operate in steeply oblique positions, is required in particular for engines for highly dynamic ships, for example rescue boats.

In the context of the invention, the feature "operation in steeply oblique positions" and/or "capability of operating in steeply oblique positions" expediently encompasses inclinations of the crankcase ventilation system K and/or of the engine during operation of over 45°, over 60°, over 75° or over 80° relative to the horizontal.

The feature "capability of operation in roll-over situations" or "roll-over" refers in particular to rotations into an upside down position, and/or 360° rotations, during the operation of the crankcase ventilation system K or of the engine.

As shown the FIGURE crankcase ventilation system K comprises an extraction point 1 for blow-by, a crankcase 14, a compressor 7 with intake connector, a blow-by separator 3, and an oil pan 5. Blow-by connecting element 2 is a constituent part of an embodiment according to the prior art which does not exhibit capability of operation in roll-over situations, and serves merely for background information. The blow-by connecting element 2 is not part of the crankcase ventilation system K.

The crankcase ventilation system K furthermore comprises an oil return line 4 (oil return) from the blow-by separator 3 into the oil pan 5, and a line 6 for purified blow-by for connecting the blow-by separator 3 to the intake connector of the compressor 7.

The crankcase ventilation system K comprises, in addition to the blow-by separator 3, a blow-by separation container 8, which is connected to the blow-by separator 3.

The blow-by separation container 8 is arranged above the level of the blow-by separator 3, preferably directly above the latter. Other arrangements, for example on the side of the engine, are also possible.

A blow-by connecting device 2a, for example a connecting line connects the blow-by separation container 8 to the extraction point 1.

A blow-by connector 2b for example a connecting line connects the blow-by separator 3 to the blow-by separation container 8. The blow-by connector 2b comprises, in the blow-by separation container 8, an upper, substantially horizontal section and a preferably substantially vertical section extending downwards from said upper section.

The flow of medium is substantially as follows: extraction, entry into the separation container 8, exit from the separation container 8, entry into the separator 3, entry into an intake connector.

The blow-by connector 2b is connected to a shut-off part 9 in the form of a valve or of a flap. The shut-off part 9 is designed to prevent a blow-by flow from the blow-by separation container 8 in the direction of the blow-by separator 3 or even into the blow-by separator 3. In the embodiment shown, the shut-off part 9 is integrated into the blow-by separation container 8 and may be designed to be electrically, mechanically, or pneumatically actuated, preferably in a manner dependent on a detection device for detecting engine oblique positions. The shut-off part 9 may also be positioned outside the separation container 8.

The shut-off part 9 is optional, if it is sought only to permit operation of the engine in steeply oblique positions. If the shut-off part 9 is not used, the blow-by separation container 8 may serve as a collecting volume or as a coarse separator and/or pre-separator.

The blow-by separation container 8 is connected via an oil return element 10 (oil return line) to the oil pan 5. The blow-by separator 3 is connected via an oil return 4 (oil return line) to the oil pan 5. The oil return 4 may have a safety 13 in the form of a check valve, solenoid valve, or flap, to prevent a backflow of oil from the oil pan 5 into the blow-by separator 3.

The crankcase ventilation system K comprises a collecting container 12. The collecting container 12 is connected via a safety element 11 to the oil return element 10. The safety element 11 may be in the form of a flap or valve, preferably an overpressure valve and/or solenoid valve. If the pressure in the crankcase ventilation system K rises above an admissible level, for example during operation in a roll-over situation and/or in a steeply oblique position, it is preferably the case that the shut-off part 9 is closed and the safety element 11 is opened, such that any escaping oil can pass via the safety element 11 into the collecting container 12. The extraction via the cylinder head is however merely one option.

The crankcase ventilation system K, in particular the oil separation container 8, expediently serves, during engine operation in steeply oblique positions or in roll-over situations of the engine and/or of the crankcase ventilation system K, to prevent oil from being able to enter a combustion chamber of the engine from the oil pan 5, for example from being entrained or drawn in by the crankcase ventilation system and thus passing into the combustion chamber, which may consequently lead to engine damage.

The crankcase ventilation system K may comprise a detection device 20 for the indirect or direct detection of engine oblique positions during the operation of the engine. The detection device may for example comprise an inclination sensor, seismic sensor, pendulum, etc.

The shut-off part 9 may be closed for a defined time if a predefined or inadmissible engine oblique position is detected by the detection device 20. Alternatively or in addition, the engine may be operated in reduced fashion or shut off if a predefined or inadmissible engine oblique position is detected by the detection device 20. Inadmissibly steep engine oblique positions may comprise steep inclinations without a roll-over of the engine occurring, or may comprise steep inclinations followed by a roll-over of the engine.

The function or operation of the crankcase ventilation system K can be described as follows:
1. Operation of an engine in an inadmissible oblique position, and/or roll-over of an engine
2. Outputting of a switching signal by the detection device
3. Optional closure of the shut-off part 9 for a defined time
4. Optional engine operation with reduced speed and/or reduced power for a defined time
5. Entry of oil into the blow-by separation container 8
6. Possible closure of the safety 13
7. Possible opening of the safety element 11, and discharging of blow-by into the collecting container 12
8. Uprighting of the engine after the operation in the inadmissible oblique position, with or without roll-over
9. Outflow of the oil volume from the blow-by separation container 8 into the oil pan 5 via oil return element 10
10. If, after the expiry of a defined time, operation in an inadmissible oblique position is still detected, the processes described above are continued
11. If, after the expiry of a defined time, operation in an admissible oblique position is detected, the optional shut-off part 9 may be opened, and normal engine operation permitted or initiated.

In practice, the processes described above may, under some circumstances, take place in a changed sequence and/or simultaneously.

The invention is not restricted to the preferred embodiments described above. Rather, numerous variants and modifications are possible which likewise make use of the concept of the invention and which therefore fall within the scope of protection. Furthermore, the invention also claims protection for the subject matter and the features of the subclaims independently of the features and claims referred back to.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A crankcase ventilation system, for an engine having a crankcase and at least one extraction point for blow-by, the crankcase ventilation system, comprising:
   at least one blow-by separator;
   a blow-by separation container,
   wherein the at least one blow-by separator and the blow-by separation container are connected to one another; and
   at least one detection device configured to detect engine oblique positions, wherein when one of a predefined engine oblique position and an inadmissible engine oblique position is detected by the at least one detection device at least one of:
      a shut-off part is closed for a defined time,
      the engine is operated in reduced fashion, and
      the engine is shut off.

2. The crankcase ventilation system according to claim 1, wherein the blow-by separation container is arranged at least one of:
   above a level of the at least one blow-by separator,
   on a side of the engine, and
   separately from the engine.

3. The crankcase ventilation system according to claim 1, further comprising:
   at least one blow-by connector configured to connect the at least one blow-by separator to the blow-by separation container.

4. The crankcase ventilation system according to claim 3, further comprising:
   at least one blow-by connecting device configured to connect the blow-by separation container to the at least one extraction point.

5. The crankcase ventilation system according to claim 4, further comprising:
   the shut-off part connected to the at least one blow-by connector and configured to prevent a blow-by flow from the blow-by separation container in a direction of the at least one blow-by separator or into the at least one blow-by separator.

6. The crankcase ventilation system according to claim 5, wherein the shut-off part is at least one of:
   integrated into the blow-by separation container and
   actuated one of electrically, mechanically, or pneumatically.

7. The crankcase ventilation system according to claim 5, wherein at least one of the at least one blow-by connecting device and the at least one blow-by connector comprises an upper section and a lower section that proceeds from the upper section.

8. The crankcase ventilation system according to claim 7, wherein the upper section is horizontal.

9. The crankcase ventilation system according to claim 1, further comprising:
   at least one oil return element configured to connect the blow-by separation container to an oil pan.

10. The crankcase ventilation system according to claim 9, further comprising:
    at least one oil return configured to connect the at least one blow-by separator to an oil pan.

11. The crankcase ventilation system according to claim 10, wherein the at least one oil return has a safety configured to prevent a back flow of oil from the oil pan into the at least one blow-by separator.

12. The crankcase ventilation system according to claim 11, wherein the safety comprises one of a flap, a valve, a check valve, and a solenoid valve.

13. The crankcase ventilation system according to claim 9, further comprising:
    a collecting container connected to the at least one oil return element and configured to collect oil that escapes during operation in at least one of a roll-over situation and a steeply oblique position; and
    a safety element is configured to open during operation in the at least one of the roll-over situation and the steeply oblique position, configured to conduct the oil that escapes into the collecting container.

14. The crankcase ventilation system according to claim 13, wherein the safety element is one of a flap, a valve, an overpressure valve, and a solenoid valve.

15. The crankcase ventilation system according to claim 1, further comprising:
    at least one line element for purified blow-by leads from the at least one blow-by separator to an intake device of a compressor.

16. The crankcase ventilation system according to claim 1, wherein the blow-by separation container, is configured to prevent oil from entering a combustion chamber of the engine during engine operation in at least one of a steeply oblique position and a roll-over situation.

17. The crankcase ventilation system according to claim 1, wherein the crankcase ventilation system is for the engine capable of one or more of operation in roll-over situations, operation in steeply oblique positions, and for permitting such operation.

18. The crankcase ventilation system according to claim 1, wherein the one of the predefined engine oblique position and the inadmissible engine oblique position is at least 45° relative to a horizontal, without a roll-over occurring.

* * * * *